M. A. COSTAS.
COMBINATION SQUARE, LEVEL, AND PROTRACTOR.
APPLICATION FILED JULY 10, 1917.
1,264,161.
Patented Apr. 30, 1918.
2 SHEETS—SHEET 1.
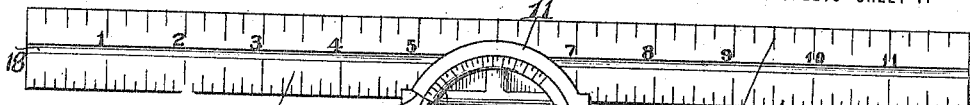
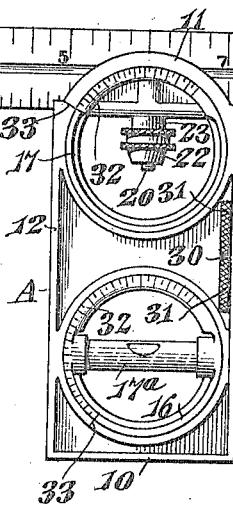
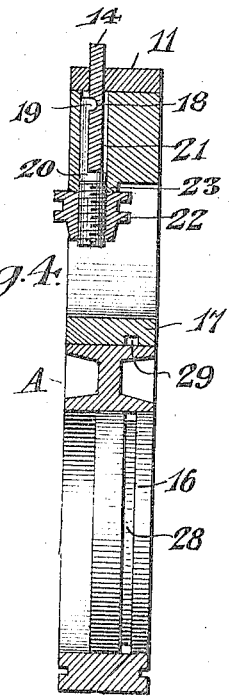
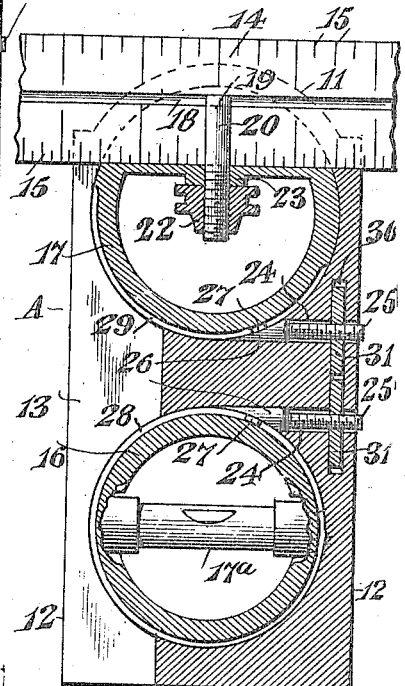
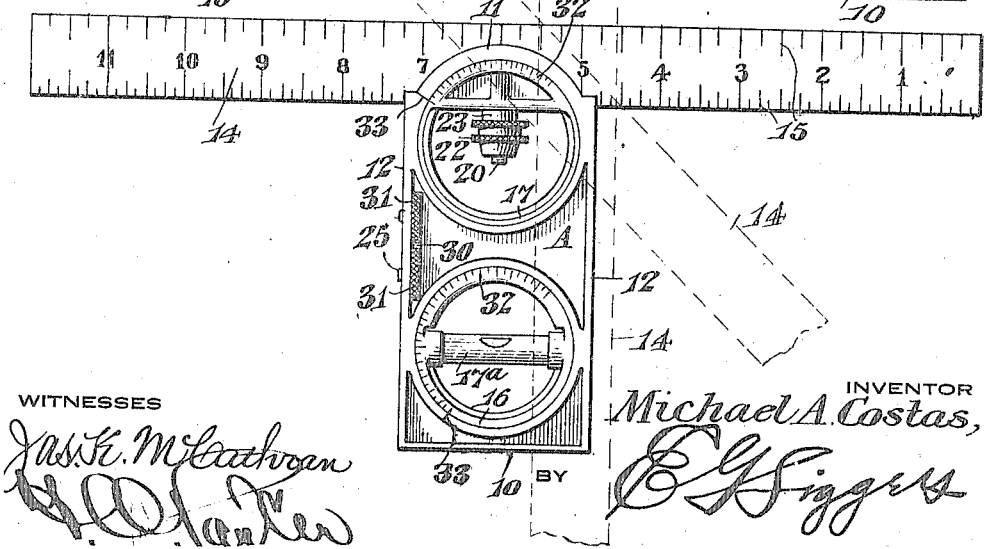
WITNESSES
INVENTOR
Michael A. Costas,
BY
ATTORNEY

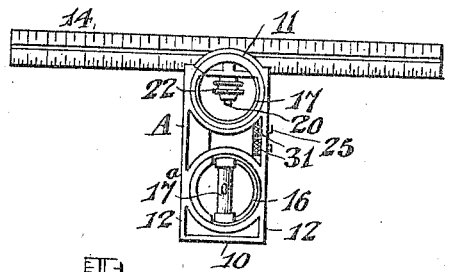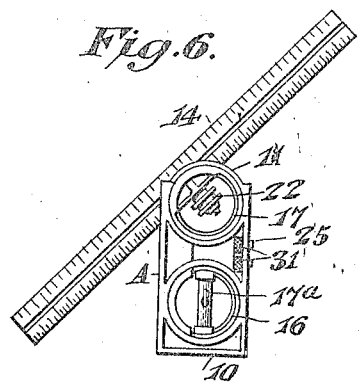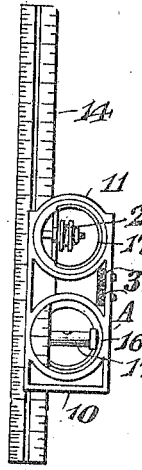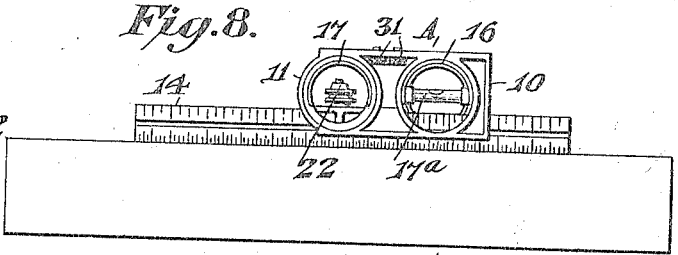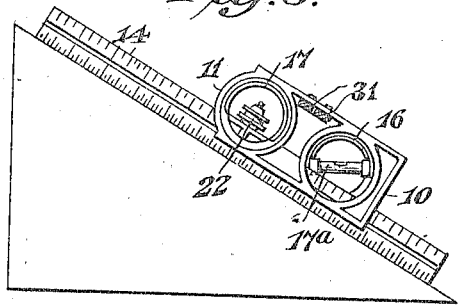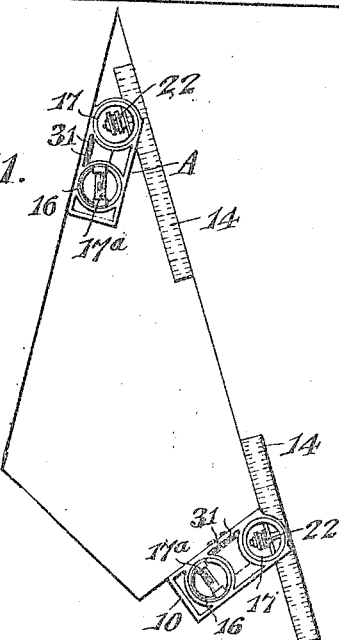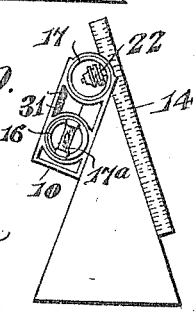

UNITED STATES PATENT OFFICE.

MICHAEL A. COSTAS, OF BIDDEFORD, MAINE.

COMBINATION SQUARE, LEVEL, AND PROTRACTOR.

1,264,161.

Specification of Letters Patent.  Patented Apr. 30, 1918.

Application filed July 10, 1917.  Serial No. 179,697.

*To all whom it may concern:*

Be it known that I, MICHAEL A. COSTAS, a subject of the Sultan of Turkey, residing at Biddeford, in the county of York and State of Maine, have invented a new and useful Combination Square, Level, and Protractor, of which the following is a specification.

The invention relates to a combined square, level, plumb and protractor.

The primary object of the invention is the provision of an instrument of this character, which is adjustable for the convenient use thereof by mechanics, such as machinists, carpenters, and other like artificers, the instrument being capable of use as an inclinometer, a square, a miter, a level, a plumb, a protractor, a bevel, a rule, and angle dividers, as well as for other special uses, the construction being novel in form to insure accuracy in adjustment and also in the laying off of the work.

Furthermore, the invention has for another object, to improve instruments of the indicated character, in various particulars, to the end that efficiency in operation may be promoted, as well as simplicity in construction and convenience of adjustment and control.

The invention will be particularly explained in the specific description following:

Reference is to be had to the accompanying drawings forming part of this specification, in which similar characters of reference indicate corresponding parts in all views.

Figure 1 is a plan view of the instrument constructed in accordance with the invention.

Fig. 2 is a similar view looking toward the opposite side, showing by full lines one position of the blade or straight edge rule, and by dotted lines other positions thereof.

Fig. 3 is a fragmentary enlarged longitudinal sectional view, showing in detail the slot or guide way for the straight edge or rule and the mounting of the graduated rings.

Fig. 4 is a transverse sectional view, taken longitudinally of the stock.

Fig. 5 is a detail view, showing the instrument adjusted as a T square.

Fig. 6 is a similar view of the instrument shown as a protractor.

Fig. 7 is a similar view of the instrument shown as a plumb.

Fig. 8 is a similar view of the instrument shown as a level.

Fig. 9 is a similar view of the instrument shown as an inclinometer.

Figs. 10 and 11 are similar views, showing the instrument for use in other adjusted positions.

In constructing a practical embodiment of the invention in accordance with the illustrated example, the stock A is provided, which is in the form of a substantially rectangular-shaped frame, preferably made from metal having the straight and rounded end edges 10 and 11, respectively, and the straight side edges 12, the edges 10 and 12 being designed to form bearing faces for the stock, while cut, or otherwise provided, in the rounded edge 11, and one side edge 12, to one side of the center of the stock is a continuous groove or slot 13 for accommodating a straight edge rule or blade 14 which, on opposite faces thereof, has marked or otherwise indicated graduated scales 15, indicative of inch measurements, and various fractions thereof, the straight edge rule or blade 14 being of the required length, as the case may require.

Formed in the frame constituting the stock A are spaced circular openings in which are mounted rotatable graduated rings 16 and 17, respectively, the ring 16 being of considerably less thickness than the thickness of the frame, and is disposed at one side of the line of the slot 13 therein, while the ring 17 is of a thickness corresponding to the thickness of said frame and the straight edge rule or blade 14 is adjustably secured to the ring 17, so as to be carried thereby and held in various positions. The rotatable graduated disk 17 has a slot which fits over the straight edge rule or blade 14 and is adapted to register with the slot 13 in the frame of the stock A, while formed in one face of the rule or blade 14 longitudinally thereof is a groove or channel 18 for receiving the shoe 19 on the end of a locking screw 20, which screw is fitted in a suitable guideway 21 formed in the walls of the slot in the rotatable graduated ring 17, and has threaded on its inner end a bur or nut 22 working against a boss 23 surrounding the screw 20 and formed on the ring, so that on the working of the bur or nut 22, upon the screw, the rule or blade 14 will be secured in the graduated ring 17, which on the rotation thereof in the frame of the stock A will bring the rule or blade 14 to the position shown by full lines in Figs. 1, 2 and 3, and to other positions shown by dotted lines in said Fig. 2 of the drawings, for the laying off of angles or for other purposes, in the execution of work.

The ring 16 has fitted therein a spirit level tube 17ª, and this disk is rotatable within the frame of the stock A to dispose the spirit level in various positions relative to the edges of said frame or the positions of the straight edge rule or blade, so as to determine accurately a true level in the use of the instrument.

In Fig. 5 of the drawings, the instrument is shown with the stock A constituted by the frame adjusted at right angles to the straight edge rule or blade 14, so that the instrument can be used as a T square.

In Fig. 6 of the drawings, there is shown the straight edge rule or blade 14 adjusted at an oblique angle to the stock, thereby enabling the instrument to be used as a protractor for the laying off of angles.

In Fig. 7 of the drawings, the rule or blade 14 is shown shifted to parallel relation with the stock, so that the instrument is capable for use as a plumb. In Fig. 8 of the drawings, the rule or blade 14 is in the same position relative to the stock as shown in Fig. 7, yet disposed horizontally so that the instrument may be used as a level.

In Fig. 9 of the drawings, the instrument, with the parts thereof adjusted, is designed for use as an inclinometer, while in Figs. 10 and 11, the instrument is shown in adjusted positions for measuring angles or use as a miter.

Opening through the side edge 12 opposite that containing the slot 13 and tangentially inter-secting the openings for the rings 16 and 17 at the inner sides thereof are bores 24, in which are located wedge screws 25, the wedging heads 26 of which coact with the rings 16 and 17, respectively, for locking said rings in adjusted position within the frame of the stock A, and these heads are provided with lugs 27, which engage in the channels or grooves 28 and 29, respectively, formed in said rings 16 and 17. The channel or groove 29 extends only partially circumferentially of the ring 17, while the channel or groove 28 in the ring 16 extends entirely about the same, and in this manner the rings are held within the openings therefor in the stock A, while occupying a cut away portion 30 in the frame are knurled adjusting nuts 31, which are threaded on the screws 25, so that on the turning of the nuts 31 by hand, the screws 25 will be moved for the locking or unlocking of the rings 16 and 17 to hold the same in their adjusted position in the stock A of the instrument.

The opposite faces of the rings 16 and 17 are provided with graduated marks 32, which coact with a pointer or indicator mark 33 on the frame A, at both sides thereof, so that the adjustment of the rings can be determined with accuracy, and in this manner the instrument can be used for the laying off of angles, as will be clearly apparent.

From the foregoing, it is thought that the construction and manner of operation of the invention will be clearly understood, and, therefore, a more extended explanation has been omitted.

What is claimed is:—

1. An instrument of the character described, comprising a stock having three straight edges and provided with a slot extending throughout one side and end, a rotatable ring in the stock and formed with a slot adapted to register with the slot in said stock, a straight edge blade slidably engaging in the slots, means for locking the blade in the slotted ring, an adjusting screw mounted in the stock and having a wedging head to engage the ring for locking it against rotation, and an adjusting nut in the stock near one edge engaged on the screw and exposed on opposite sides of said stock.

2. An instrument of the character described, comprising a stock having a slot extending throughout one side and end edge, rotatable rings in the stock, one being formed with a slot adapted to register with the slot in said stock, and the other ring disposed in said stock at one side of its slot, a straight edge blade slidably engaging in the slots to be carried by one of the rings, means for locking the blade in the slotted ring, a wedging member located and working between the rings and the adjacent wall of the stock to lock said rings, and adjusting nuts in said stock engaged with the members for moving the same and accessible from either side of said stock.

3. An instrument of the character described, comprising a stock, a rotatable ring in the stock, a straight edge blade slidably engaging the ring, means for locking the blade in the ring, an adjustable wedging member working between the ring and the adjacent wall of the stock to lock said ring, and a rotatable spirit level carrying ring in said stock.

4. An instrument of the character described, comprising a stock, a rotatable ring in the stock, an adjustable wedging member working between the ring and the adjacent wall of the stock to lock said ring, means on the member and engaging the ring to prevent separation thereof from the stock and a spirit level in the ring.

5. An instrument of the character described comprising a stock, having a slot extending throughout one side and end edge, rotatable rings in the stock, one ring being formed with a slot adapted to register with the slot in said stock, a straight edge blade slidably engaging in the slots, a spirit level tube in the other ring, means for locking the blade in the slotted ring, and adjustable wedging members mounted in the stock between the rings and working between said rings and the adjacent wall of the stock to lock the rings.

6. An instrument of the character described comprising a stock, having a slot extending throughout one side and end edge, rotatable rings in the stock, one ring being formed with a slot adapted to register with the slot in said stock, a straight edge blade slidably engaging in the slots, a spirit level tube in the other ring, means for locking the blade in the slotted ring, adjustable wedging members mounted in the stock between the rings and working between said rings and the adjacent wall of the stock to lock the rings to the support, and means on the members to engage and hold the rings against separation from the stock, each of said rings being formed with graduated marks on opposite faces, while the stock is provided with an indicator coacting with said graduated marks.

7. An instrument of the character described comprising a stock, rotatable rings in the stock, a straight edge blade slidably engaging in one ring, a spirit level tube in the other ring, means for locking the blade and ring together, adjustable wedging members mounted in the stock between the rings and working between said rings and the adjacent wall of the stock to lock the rings, each ring being formed with a groove, and lugs projecting from the wedging members and engaged in the grooves to hold the rings in the stock.

8. An instrument of the character described comprising a stock, having a slot extending throughout one side and end edge, rotatable rings in the stock, one ring being formed with a slot adapted to register with the slot in said stock, a straight edge blade slidably engaging in the slots, a spirit level tube in the other ring, means for locking the blade in the slotted ring, adjustable wedging members mounted in the stock between the rings and working between said rings and the adjacent wall of the stock to lock the rings, each ring being formed with a groove, lugs projecting from the wedging members and engaged in the grooves to hold the rings in the stock, and knurled adjusting nuts engaging the wedging members and exposed at opposite sides of the stock.

In testimony that I claim the foregoing as my own, I have hereto affixed my signature in the presence of two witnesses.

MICHAEL A. COSTAS.

Witnesses:
EUSTACE P. KONDELONES,
CHRIST J. DILLON.